March 12, 1929.   H. L. KIZZIAR   1,704,896
VARIABLE TRANSMISSION MECHANISM
Filed March 5, 1928   5 Sheets-Sheet 1

Inventor

Henry L. Kizziar

By *Clarence A. O'Brien*
Attorney

March 12, 1929.  H. L. KIZZIAR  1,704,896
VARIABLE TRANSMISSION MECHANISM
Filed March 5, 1928   5 Sheets-Sheet 2
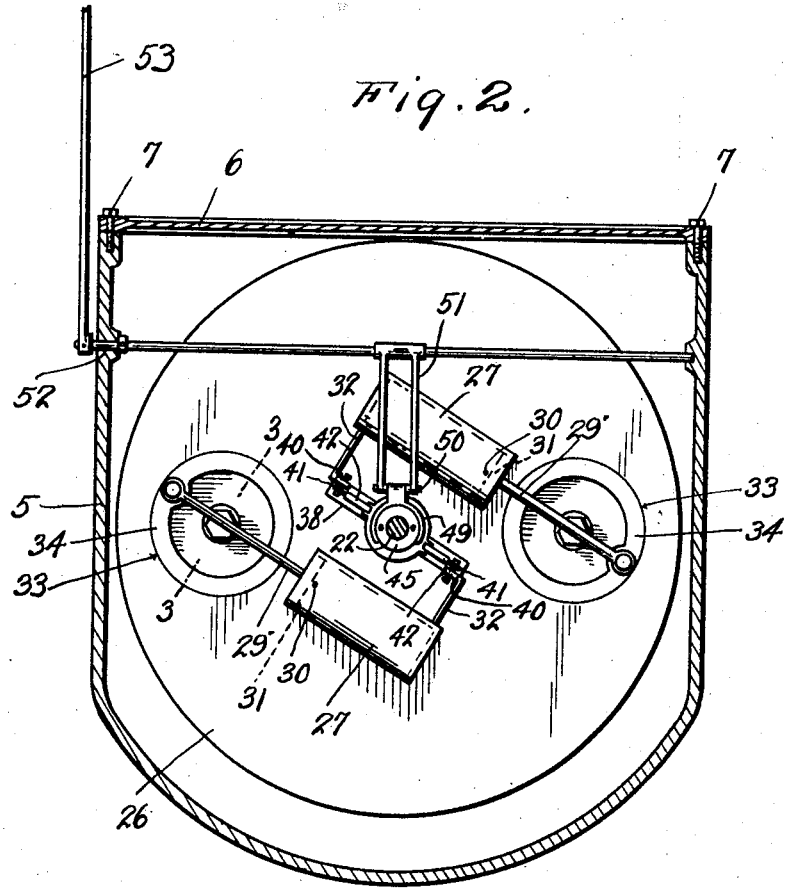
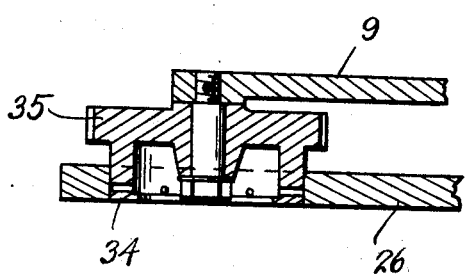
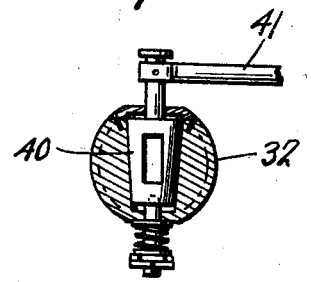
Inventor
Henry L. Kizziar
By *Clarence A. O'Brien*
Attorney March 12, 1929.  H. L. KIZZIAR  1,704,896
VARIABLE TRANSMISSION MECHANISM
Filed March 5, 1928   5 Sheets-Sheet 3

Inventor
Henry L. Kizziar
By *Clarence A. O'Brien*
Attorney

March 12, 1929.  H. L. KIZZIAR  1,704,896
VARIABLE TRANSMISSION MECHANISM
Filed March 5, 1928   5 Sheets-Sheet 4

Inventor
Henry L. Kizziar
By Clarence A. O'Brien
Attorney

March 12, 1929. H. L. KIZZIAR 1,704,896
VARIABLE TRANSMISSION MECHANISM
Filed March 5, 1928    5 Sheets-Sheet 5

Inventor
Henry L. Kizziar
By Clarence A. O'Brien
Attorney

Patented Mar. 12, 1929.

1,704,896

UNITED STATES PATENT OFFICE.

HENRY L. KIZZIAR, OF PENSACOLA, FLORIDA.

VARIABLE TRANSMISSION MECHANISM.

Application filed March 5, 1928. Serial No. 259,183.

The present invention relates generally to the transmission of power, more especially in connection with autos and other motor cars and has for its primary object the provision of an arrangement by which the usual functions of the ordinarily separate transmission and clutch may be combined in a single strong, durable and efficiently operating apparatus which will permit a wide range of variation in speed and power, depending upon the requirement.

Another very important object of the invention resides in the provision of a transmission mechanism of this nature, which includes a plurality of cylinders with pistons reciprocating therein, and means to control the movement of the pistons whereby a variable relationship may be obtained between two rotatable elements, one driven by the other through the mechanism.

A still further very important object of the invention resides in the provision of a transmission mechanism of this nature which is comparatively simple in its construction, easy to manipulate, strong and durable, and thoroughly reliable in operation.

A further object of the invention resides in the provision of a transmission mechanism of this nature wherein the parts are arranged in a compact and convenient manner for ready and easy manipulation and control.

A further object of the invention resides in the provision of a minutely variable transmission mechanism of this nature, having a simple and efficient resisting mechanism incorporated therewith.

With the above and numerous other objects in view, as will appear as the description proceeds, the invention resides in certain novel features of construction, and in the combination and arrangement of parts as will be hereinafter more fully described and claimed.

In the drawing:

Figure 2 is a vertical transverse section therethrough taken substantially on the line 2—2 of Figure 1.

Figure 3 is an enlarged detail section taken substantially on the line 3—3 of Figure 2.

Figure 4 is an enlarged detail section taken through the valves.

Figure 1:
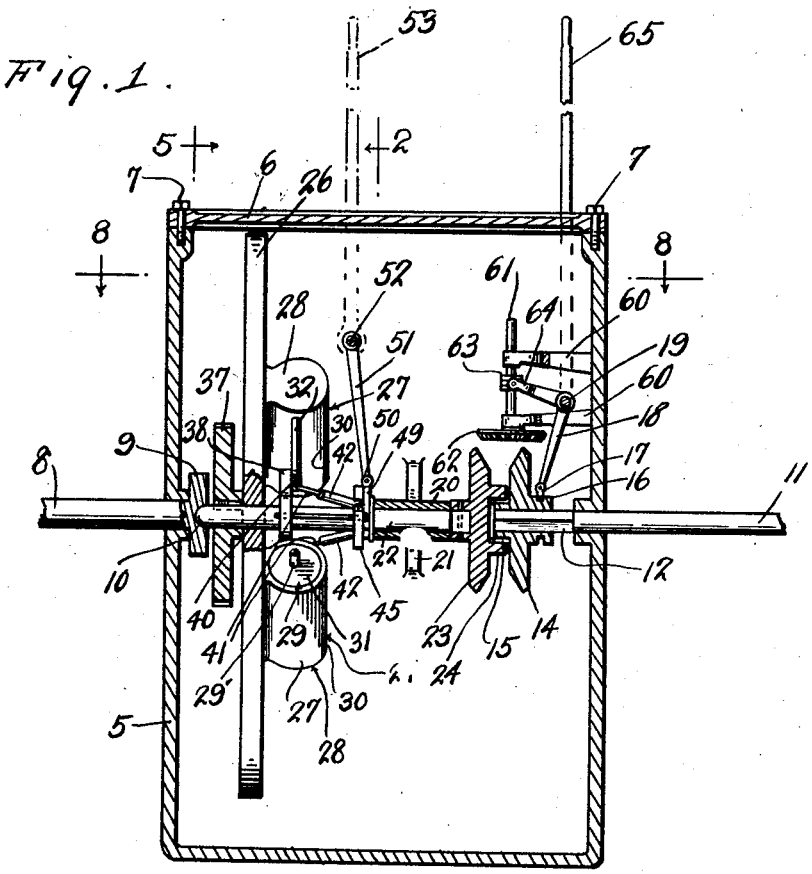
Figure 1 is a vertical longitudinal section through the mechanism embodying the features of this invention.
Figure 10:
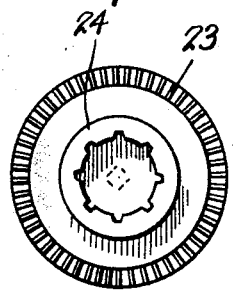
Figures 10 and 11 are plan views of combined clutch and bevelled gears used in the reversing mechanism.
Figure 11:
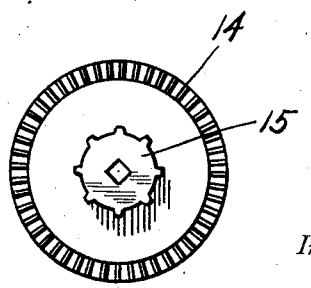
Figure 5:
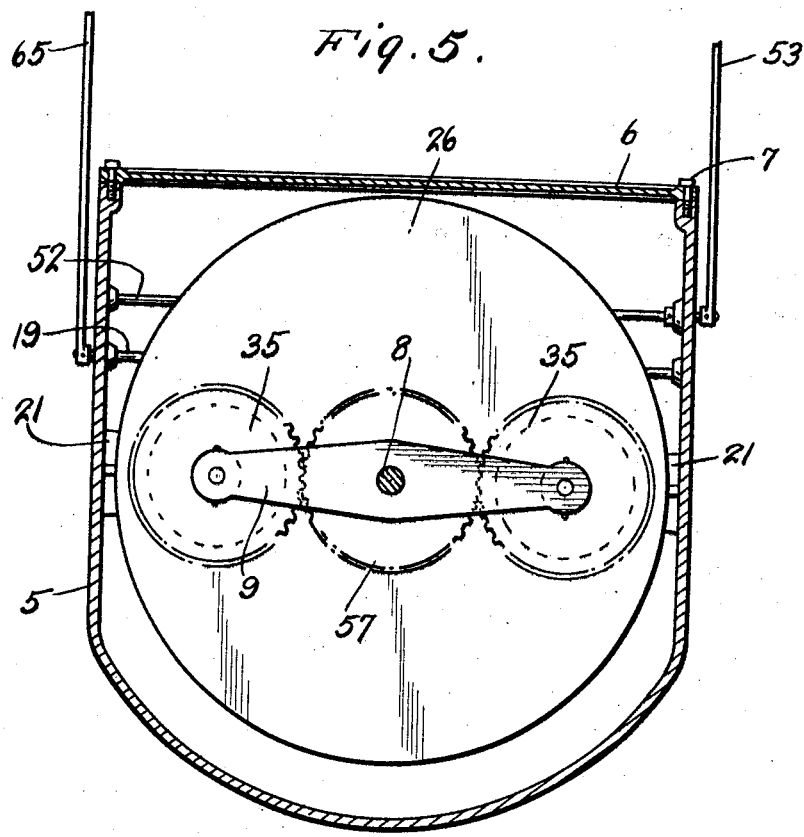
Figure 5 is a transverse vertical section taken substantially on the line 5—5 of Figure 1.
Figure 6:
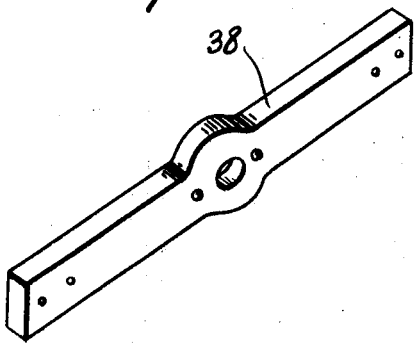
Figure 6 is a perspective view of a bar for supporting the ends of the pipes leading from the cylinders.
Figure 7:
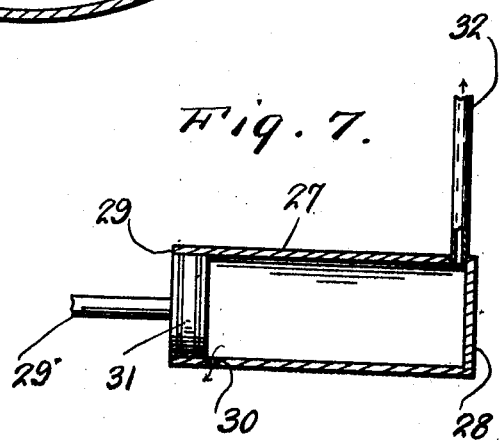
Figure 7 is a longitudinal section through one of the cylinders.
Figure 8:
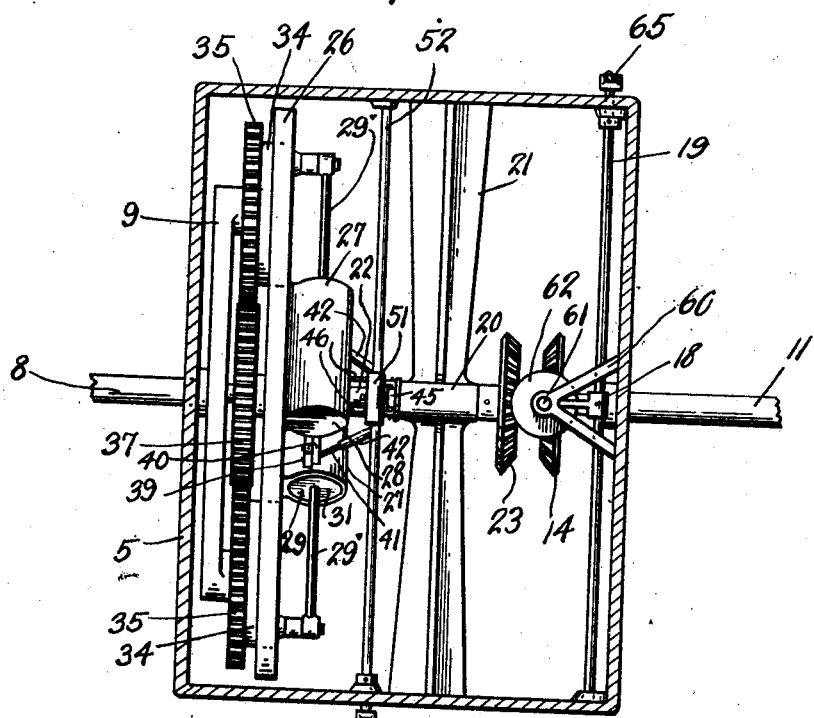
Figure 8 is a horizontal section taken substantially on the line 8—8 of Figure 1.
Figure 9:
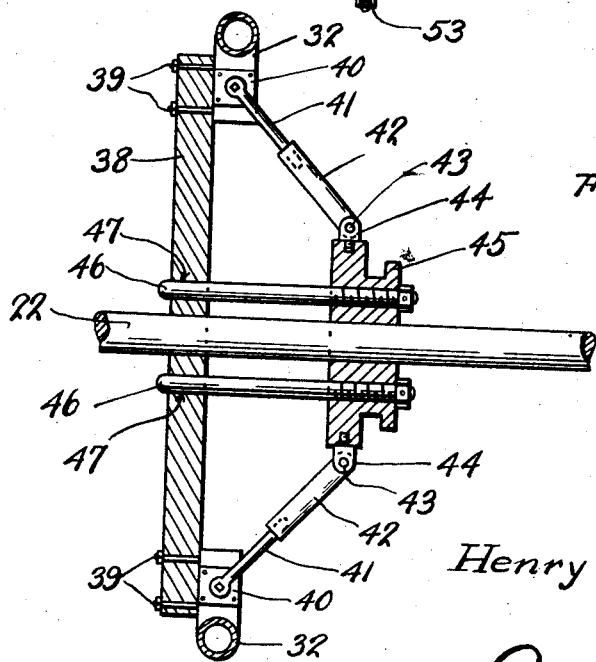
Figure 9 is a detail section through the cylinders and supports therefor.

Referring to the drawing in detail, it will be seen that the numeral 5 denotes a casing with a removable cover plate 6 bolted or otherwise secured thereto, as at 7. A drive shaft 8 is journaled through the front wall of the casing 5 and has a cross arm 9 fixed or formed integrally on the inner end thereof and provided at its center with a recess 10. A driven shaft 11 is journaled through the rear wall of the casing 5 and has its inner end squared as at 12, for slidably receiving a bevelled gear 14 with a male clutch element 15. A grooved collar 16 is formed on the bevelled gear 14 and receives a fork 17, engaged with a bell crank lever 18 fixed to a shaft 19 journaled through the sides of the casing to extend thereacross. A bearing 20 is formed at the center of the cross member 21 fixed to the inner surfaces of the side walls of the casing 25 and has journaled therein a counter shaft 22, one end of which extends into the recess 10, and on the other end of which is fixed a bevelled gear 23, having a female clutch element 24, for receiving the male clutch element 15, when the gear 14 is slid to the position shown in Figure 1, which is the normal driving position.

A disc 26 is rotatable on the counter shaft 21 and has mounted on the rear face thereof two or more cylinders 27, disposed tangentially to the counter shaft in spaced relation thereto. Each cylinder has a closed end 28 and an open end 29 and is provided adjacent the open end with an aperture 30 which will be cleared by piston 31 slidable in the cylinder when it reaches the open end. A pipe 32 leads laterally from the closed end of the cylinder. In the present embodiment of the invention, the disc 26 is provided with a pair of annular recesses 33 on opposite sides of the center, for rotatably receiving extensions 34 of gears 35, which are journaled on the ends of the cross arms 9. A gear 37 is keyed to the counter shaft 22 and meshes with the gears 35. A cross arm 38 has its intermediate portion rotatable on the counter shaft 22 and has fixed to the ends by bolts 39 or other means, the extremities of the pipes 32, the said extremities being preferably directed laterally. Valves 40 are rotatable in the extremities of the pipes 32 and are actuatable by cranks 41, which are slidable in tubular rods 42. These tubular rods 42 are pivotally engaged as at 43, with the brackets 44 on a collar 45 slidably rotatable on the counter shaft 22 and having pins 46 projecting in parallelism with the counter shaft through openings 47 in the cross arm 38, one to each side of the center thereof. This collar 45 is grooved to receive a fork 49 which is pivotally engaged, as at 50, with a crank 51, on a shaft 52, journaled across the casing and actuatable by a lever 53. Obviously, by sliding the collar 45 on the counter shaft by the lever 53, the shaft 52 and the crank 51, it will be seen that the valves 40 may be opened and closed.

Figure 12:
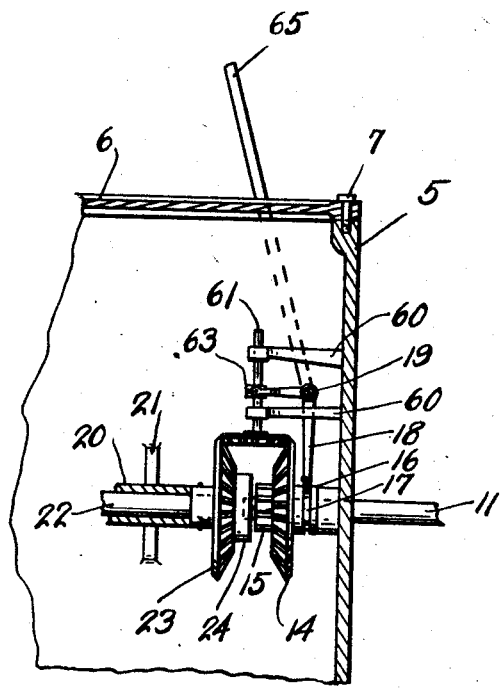
Figure 12 is an enlarged detail vertical longitudinal section showing the reversing mechanism in a different position from that shown in Figure 1.
Figure 13:
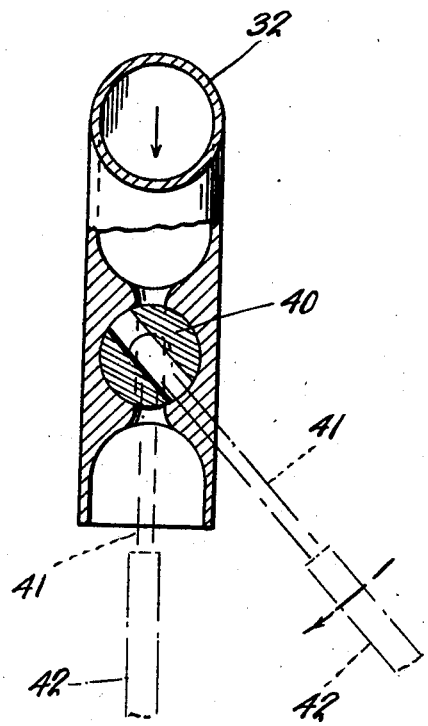
Figure 13 is a sectional view, taken through the valved end of one of the pipes leading from one of the cylinders.
Figure 14:
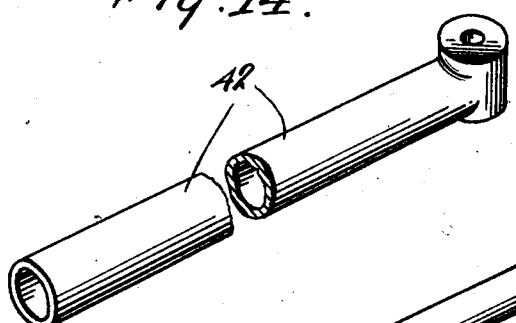
Figures 14, 15 and 16 are perspective views of the elements of the valve operating rods.
Figure 15:
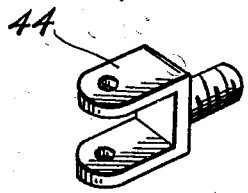
Figure 16:
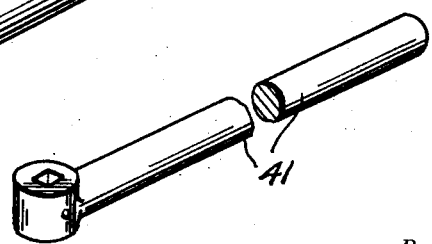

A pair of brackets 60 extend inwardly from the rear wall of the casing 5, one above the other and have slidable through their ends, a shaft 61, on the lower end of which is a bevelled pinion 62. A grooved collar 63 is fixed on the shaft 61 and receives a fork 64 at the other end of the bell crank lever 18. When the shaft 19 is rocked by a lever 65 to disengage the clutch element 15 from the clutch element 24, thereby moving the gear 14 from the gear 23, the pinion 62 is lowered into mesh with the gears 14 and 23, as is illustrated in Figure 12.

With the parts positioned as shown in Figure 1, the valves 40 are opened, and the rotation of the drive shaft 8 revolves the cross arm 9 and moves the gears 35 in a circular orbit rotating about their axis with the gear 37 remaining stationary. The revolving of the gears 35, cause the reciprocation of the pistons 31 in the cylinders 27, thereby alternately pumping and sucking air from and into the pipes 32. If the collar 45 is moved away from the cross arm 38 by actuation of the lever 53, it will be seen that the valves are closed. As the valves close, it will be seen that the rotation of the gears 35 is retarded, so that they will gradually pick up the gear 37 to rotate at a slower rate of speed than the disc 26 and when the valves are finally closed, the gear 37 will rotate at the same rate of speed with the disc 36. Of course the rotation of the gear 37 causes the rotation of the counter shaft 22, which will rotate the driven shaft 11 therewith in the same direction when the parts are positioned as shown in Figure 1, or in an opposite direction when the parts are disposed as shown in Figure 12.

Any suitable lubricating means may be used in conjunction with transmissions, but if it is desired an amount of oil may be stored in the lower portion of the casing so as to cause the gears 35 and 37 to practically run in oil and be noiseless and of course the other movable parts may be lubricated by a splash system set up by the dipping of the gears and other parts in the bath of oil. Furthermore, it will be seen that a certain amount of the oil will be sucked in the cylinders to afford proper lubrication for the pistons and this oil will be sprayed out therefrom in a fine mist, thereby further assisting in the lubrication of the parts.

It is thought that the construction, operation and advantages of the invention will now be clearly understood without a more detailed description thereof. It will be seen that variable speeds both forwardly and rearwardly may be attained by this structure, without the necessity of any clutch. Such a transmission, of course, is particularly useful in an automobile, and enables a gradual start evenly therefrom, from a stand still, and also provides means for the proper gear ratio between the drive and driven shaft, to climb hills.

The present embodiment of the invention has been disclosed in detail, merely for the purpose of exemplification, since in actual practice, it will attain the features of advantage enumerated as desirable in the statement of the invention and the above description.

It is apparent that changes in the details of construction and in the combination and arrangement of parts may be resorted to, without departing from the spirit or scope of the invention as hereinafter claimed or sacrificing any of its advantages.

Having thus described my invention, what I claim as new is:

1. A transmission mechanism including a drive shaft, a driven shaft, a cross arm on one of the shafts, a cylinder supporting member rotatable on the other shaft, a pair of cylinders on the member on opposite sides of the other shaft and tangential thereto, said member being provided with a pair of annular recesses on opposite sides of the other shaft, a pair of gears having annular projections rotatable in the recesses, means rotatably mounting the gears on the ends of the cross arm, pistons in the cylinders, connecting rods extending from the pistons and eccentrically engaged with the gears, each cylinder having one end closed and the other end opened, a pipe leading from the closed ends of the cylinders and having laterally extending terminals, a supporting bar rotatably mounted intermediate its ends on the other shaft and having the extremities of the pipes fixed thereto, valves in said extremities, a gear on the first shaft meshing with the first mentioned gear, and means for closing and opening the valves.

2. A transmission mechanism including a drive shaft, a driven shaft, a cross arm on one of the shafts, a cylinder supporting member rotatable on the other shaft, a pair of cylinders on the member on opposite sides of the other shaft and tangential thereto, said member being provided with a pair of annular recesses on opposite sides of the other shaft, a pair of gears having annular projections rotatable in the recesses, means rotatably mounting the gears on the ends of the cross arm, pistons in the cylinders, connecting rods extending from the pistons and eccentrically engaged with the gears, said cylinder having one end closed and the other end opened, a pipe leading from the closed ends of the cylinders and having laterally extending terminals, a supporting bar rotatably mounted intermediate its ends on the other shaft and having the extremities of the pipes fixed thereto, valves in said extremities, a gear on the first shaft meshing with the first mentioned gear, a member slidable on the other shaft and means operatively connecting the member with the valve, so that by sliding the member the valve may be closed and opened.

3. A transmission mechanism including a drive shaft, a driven shaft, a cross arm on one of the shafts, a cylinder supporting member rotatable on the other shaft, a pair of cylinders on the member on opposite sides of the other shaft and tangential thereto, said member being provided with a pair of annular recesses on opposite sides of the other shaft, a pair of gears having annular projections rotatable in the recesses, means rotatably mounting the gears on the ends of the cross arm, pistons on the cylinders, connecting rods extending from the pistons and eccentrically engaged with the gears, said cylinder having one end closed and the other end opened, a pipe leading from the closed ends of the cylinders and having laterally extending terminals, a supporting bar rotatably mounted intermediate its ends on the other shaft and having the extremities of the pipes fixed thereto, valves in said extremities, a gear on the first shaft meshing with the first mentioned gear, a collar slidable and rotatable on the other shaft, brackets on the collar, tubular rods rockable in the brackets, tanks on the valves slidable in the tubular rods, and means for sliding the collar.

4. A transmission mechanism including a drive shaft, a driven shaft, a cross arm on one of the shafts, a cylinder supporting member rotatable on the other shaft, a pair of cylinders on the member on opposite sides of the other shaft and tangential thereto, said member being provided with a pair of annular recesses on opposite sides of the other shaft, a pair of gears having annular projections rotatable in the recesses, means rotatably mounting the gears on the ends of the cross arm, pistons on the cylinders, connecting rods extending from the pistons and eccentrically engaged with the gears, said cylinder having one end closed and the other end opened, a pipe leading from the closed ends of the cylinders and having laterally extending terminals, a supporting bar rotatably mounted intermediate its ends on the other shaft and having the extremities of the pipes fixed thereto, valves in said extremities, a gear on the first shaft meshing with the first mentioned gear, a collar slidable and rotatable on the other shaft, brackets on the collar, tubular rods rockable in the brackets, tanks on the valves slidable in the tubular rods, said collar being formed with an annular groove, a fork engaged in said groove, a rock shaft, a crank extending from the rock shaft and engaged with the fork, and means for rocking the shaft.

In testimony whereof I affix my signature.

HENRY L. KIZZIAR.